3,443,928
METHOD FOR CONTROLLING THE GROWTH OF POTATO PLANT ORGANISMS
Gordon S. Batchelor, Mountain Lakes, N.J., assignor to Allied Chemical Corporation, New York, N.Y., a corporation of New York
No Drawing. Filed Apr. 25, 1966, Ser. No. 544,703
Int. Cl. A01n 9/24; A23b 7/14
U.S. Cl. 71—123                                20 Claims

ABSTRACT OF THE DISCLOSURE

Perhalogenated acetones of the formula $$X_3C-\underset{\underset{O}{\|}}{C}-CX_2F$$

wherein X may be a member independently selected from the group consisting of F and Cl, or a hydrate thereof, are useful as vine killers and as sprout inhibiting agents on a variety of plant organisms, particularly potato plants. The disclosed vine killing and sprout inhibiting agents have the unique property in that when they are applied to a growing plant to effect deterioration of the plant's vines above surface, inhibiting effects will be created in the sub-surface root or tuber portion of the plant.

---

This invention relates to sprout inhibiting compounds which additionally are capable of killing vines, to formulations comprising effective amounts of such compounds and to methods for employing the same to control the growth of plant organisms. In a preferred embodiment the invention relates to a method for utilizing the sprout inhibiting compounds and formulations of the invention to treat, in a single application, a growing plant to effect deterioration of the plant's vines, above surface, as well as to effect sprout inhibition in the sub-surface root or tuber portion of the plant, which sprout inhibition properties in the roots or tubers will persist for long periods of time even after such have been removed from the ground.

The marketability of a large number of tuber and root-type vegetables as well as flower bulbs, for example, is adversely affected by the tendency of such plant organisms to sprout new tissue growth under conditions which are likely to exist at some time or other before the vegetable is consumed or before the bulb is utilized. A good example of such a plant organism is the potato tuber, the sprouting of which in home storage bins has been encountered by every housewife. Sprouting of potatoes subsequent to harvest and before such can be transported, purchased or utilized by the consumer destroys the appearance, edibility and consequent marketability of the product. Moreover, it has recently been ascertained that such sprouts, such as appear on potato tubers, contain small amounts of toxic substances.

For the above reasons it is a common procedure in the various growing and marketing industries, such as the potato industry, to treat the harvested root, tuber or bulb organism with a sprout inhibiting chemical which will inhibit sprout formation from the organism for at least a significant period of time. To this end, I have found a small class of chemicals which are particularly effective sprout inhibitors in that they effectively inhibit sprout growth from a variety of plant organisms and maintain such sprout inhibiting effect for a substantial period of time.

Another procedure in certain vegetable growers' and marketers' schedule, particularly in the potato industry and especially in the northeastern region of the United States, is vine killing. Vine killing in the potato industry is practiced for one or more of the following reasons among others: to facilitate the use of mechanical harvesters, to minimize labor and expense in harvesting operations, to control tuber size, to permit crop harvest prior to freezing weather, to prevent late blight tuber rot and to minimize the spread of various virus diseases. A variety of chemicals have been employed to effect vine killing. A common and significant drawback of many of the usual vine killing chemicals is that the vines are killed rapidly and this causes considerable discoloration of the potato tuber. Such discoloration adversely affects the potato tubers' marketability.

It has been found that the sprout inhibitors of the invention, when applied in sufficient quantities to the above surface portion of plants, for example potato plants, are effective vine killers. Moreover, the vine kill takes place slowly so that no significant accompanying discoloration of the potato tubers takes place. Defoliation of the plant may also take place. Unexpectedly, it was also found that when a sufficient quantity of the sprout inhibiting compositions is applied to growing plants to effect vine killing, enough of the chemical presumably is translocated to the sub-surface portion of the plant to impart sprout inhibiting properties to the root portion of the plant, which sprout inhibiting properties persist for a significant period of time after harvesting.

It can thus be appreciated that the sprout inhibiting compositions of the invention, aside from their primary function of inhibiting sprouting, afford the advantage of combining two highly important marketing procedures, viz. sprout inhibiting and vine killing, into a single operation. This is particularly significant in the potato growing industry. The resulting savings in time, labor and material are obvious. There is currently no single chemical known to me on the market today which is capable of simultaneously performing both these functions.

It is accordingly a major object of the invention to provide a class of sprout inhibiting compositions which produce effective and long lasting sprout inhibition in plant organisms.

A preferred object of the invention is to provide a class of chemical compositions and formulations which, in a single application to the above surface portion of a growing plant organism, will impart, by translocation, sprout inhibiting properties to the sub-surface portion of the plant, while at the same time, effect above surface vine kill.

Another object of the invention is to provide a class of chemical compositions which possess both sprout inhibiting and vine killing properties, which compositions are characterized by slow killing of the vines so that vascular discoloration of the sub-surface roots or tubers does not take place.

Other objects and advantages of the invention will become apparent from the above and remaining description.

The active sprout inhibiting compounds of the invention are perhalogenated acetones of the formula:

$$X_3C-\underset{\underset{O}{\|}}{C}-CX_2F$$

wherein X may be a member independently selected from the group consisting of F and Cl, or a hydrate thereof. The above formula includes the perhaloacetone species shown in the following table.

TABLE I

| Designation | Formula | Description | Boiling point (° C.) | Freezing point (° C.) |
|---|---|---|---|---|
| 1FK [1] | $CCl_2F \cdot CO \cdot CCl_3$ | Water clear pungent liquid. | ~164.5 | |
| 2FK [1] | $CCl_2F \cdot CO \cdot CCl_2F$ | ___do___ | 124.5 | |
| 3FK [1] | $CCl_2F \cdot CO \cdot CClF_2$ | ___do___ | 84.5 | [2] −78 |
| 4FK [1] | $CClF_2 \cdot CO \cdot CClF_2$ | ___do___ | 45.2 | [2] −100 |
| 5FK [1] | $CClF_2 \cdot CO \cdot CF_3$ | Colorless gas. | 7.8 | −133 |
| 6FK [1] | $CF_3 \cdot CO \cdot CF_3$ | ___do___ | 27.4 | −122 |

[1] Trademark of Allied Chemical Corporation.  [2] Below.

The 3FK and 4FK liquids are miscible in all proportions with water. The 1FK and 2FK liquids are not. The invention contemplates use of isomers of any of the above compounds as well as mixtures of the compounds or mixtures of isomers thereof.

The 3FK, 4FK, 5FK and 6FK compounds denoted above are commercially available. All of the 1FK through 6FK series of compounds, including isomers, however, may be prepared by reacting hexachloroacetone with anhydrous HF, while in the presence of a catalyst comprising dichromium trioxide and at temperatures in the range of about 250–550° C. The dichromium trioxide catalyst is derived from hydrous chromic oxide formed by ammonia precipitation from a trivalent chromium salt solution and subjected to heat treatment substantially in the range of about 300–400° C. for not less than about two hours. The process is described in more detail in co-pending application of Henry R. Nychka et al., entitled "Preparation of Hexafluoroacetone and Perchlorofluoroacetones," Ser. No. 226,439, filed Sept. 26, 1962 now Patent No. 3,257,457.

The term hydrate is used herein to describe a compound which is formed by the combination of water with one of the perhaloacetones described above in a definite weight ratio and which compound is either a definitely distillable liquid or a solid possessing a distinct melting point. A given perhaloacetone may form more than one hydrate. Hydrates of the perhaloacetones contemplated herein, which are known by me, are shown in Table II. Others may be found by persons skilled in the art.

TABLE II

| Hydrate | Description | Boiling point (° C.) | Melting point (° C.) |
|---|---|---|---|
| $3FK \cdot XH_2O$ | Water clear liquid | 105–106 | |
| $4FK \cdot 2\tfrac{1}{2}H_2O$ | ___do___ | 106 | −8 |
| $4FK \cdot 10H_2O$ | ___do___ | (1) | 24 |
| $5FK \cdot 3H_2O$ | ___do___ | 105 | |
| $5FK \cdot H_2O$ | White solid | (2) | 26.5 |
| $6FK \cdot 3H_2O$ | Water clear liquid | 106 | |
| $6FK \cdot H_2O$ | White solid | (3) | 40 |

[1] Unstable—breaks down to form $4FK \cdot 2\tfrac{1}{2}H_2O$ and $H_2O$ when distilled at atmospheric pressure.
[2] When heated, disproportionates to $5FK \cdot 3H_2O$.
[3] When heated, disproportionates to $6FK \cdot 3H_2O$.

The above noted hydrates are miscible in all proportions with water. The invention contemplates use of mixtures of hydrates as well as a single hydrate for the active sprout inhibiting component.

The hydrates may be prepared essentially by mixing the perhaloacetone component and water stoichiametrically or by fractionally distilling water-ketone mixtures. The hydrates of 4FK and preparation thereof, are described in more detail in U.S. Patent 2,870,211 to Miller et al. The hydrates of 5FK and 6FK and preparations thereof, are described in more detail in co-pending application of William J. Cunningham and Cyril Woolf, entitled "Fluoro Compounds And Synthesis Thereof," Ser. No. 297,220, filed July 24, 1963 now abandoned.

Any of the above described class of perhaloacetones or hydrates thereof may be employed per se to treat plant organisms for sprout inhibition and/or vine killing. The liquid members of this class of compounds are most conveniently employed and may be applied by spraying or dipping the organisms to be treated. The gaseous members of the class may be used as fumigants, preferably to treat harvested organisms in closed storage areas. The solid members of the class may be used per se by a dusting type procedure or by placing the same in close proximity to organisms to be treated in a closed storage area. Normally, enough of the solid materials will volatilize in order to accomplish fumigation of the stored organism. This method is not preferred however.

The perhalogenated acetones contemplated herein are, as a class, very hydroscopic and accordingly as a practical matter, due to the presence of moisture in the air or other surrounding environment, it is virtually impossible to employ the same without them becoming hydrated. This is immaterial, of course, since the hydrates which form also possess the desired growth regulating properties. The hydrates are the preferred form of the active ingredient. Use of a specific hydrate facilitates attaining uniformity in dosages and results.

Because of the relatively small quantities of active ingredient which are required to effect the desired control of plant growth, all of the active ingredients, whether in ketone form or in hydrate form, are preferably used in conjunction with a suitable dispersion medium. With the exception of 1FK and 2FK, the active compounds of the invention are soluble or miscible with water in all proportions. This property affords the economic advantages of permitting ready make-up of aqueous spray solutions of any desired concentrations without the use of emulsifiers, agitated mixing equipment, etc. and application to the locus to be treated in the form of easy handleable aqueous solutions which may be applied by use of the simplest type of spray apparatus. Other liquid carriers, such as acetone, glycols and hydrocarbon oils may be employed. 1FK and 2FK require the use of emulsifiers to permit application as oil-in-water or water-in-oil dispersions. Surface active agents or emulsifiers may also be used, if desired, in order to enhance, wetting, spreading and penetration properties of the sprays.

Solid dispersion mediums may also be employed and should be finely divided solids which are capable of absorbing substantial amounts of liquid or gas. In this mode active ingredient is merely impregnated on the solid dispersion medium. If the active ingredient is in solid form, it can be comminuted and thoroughly mixed with the solid dispersant. Typical solid dispersants include diatomaceous earth, wood flours, silica gels, corn cob grits and vermiculite, with or without addition of a wetting or emulsifying agent.

When water is employed as the dispersion medium for the ketones, it will be apparent from the above discussion that to the extent that water is present in a stoichiometrically sufficient amount to form a hydrate, if such exists, the hydrate will form and serve as the active ingredient. If there is a stoichiometrical excess of water present relative to the hydrate which is formed, or if water, as dispersion medium, is added to an existing hydrate, the exact chemical form of the hydrate in the excess water solution is not known. Distillable hydrates are recoverable from such solutions by distillation however, and non-distillable solid hydrates are recoverable by crystallization procedures.

The various forms of the active ingredients of the invention accord a versatility in application techniques. For example, storage areas containing the harvested plant organisms may be fumigated with gaseous 5FK or 6FK by mixing such materials with the ventilating air stream. Or, fumigation of such storage areas may be accomplished by the vaporization of solid 5FK·H$_2$O or 6FK·H$_2$O in contained areas. Spraying or dipping procedures with the liquid ketones or hydrates are very effective. Additional application techniques may be employed when the active ingredients of the invention are incorporated with dispersing agents as described above. Such additional techniques include dusting and fogging, for example.

The optimum dosages to be employed will depend somewhat upon such factors as the nature of the plant organism to be treated, the storage history of the plant organism, the form of the active compound, the species of active compound, method of application, climatic conditions, etc. The dosage applied should, of course, be an amount effective to afford the desired sprout inhibition and vine killing, if employed for that purpose. To take an example, when the hydrate sprout inhibitors of the invention are used to spray growing potato plants in order to achieve the dual function of vine killing and sprout inhibiting, it has been found that good results are obtained by applying the hydrate compounds at a rate of 1½–2 gallons per acre (exclusive of dispersion medium). The preferred range is 1–2 gallons per acre. In the case of 6FK·3H$_2$O, the weight of 6FK per gallon is 10.25 lbs., with 3.35 lbs. of hydrate associated water. As long as the active compound is applied to the plant organisms at the desired rate, the amount of dispersion medium applied with it is immaterial. To take another example, when the hydrate compounds are used as dipping solutions to treat harvested potato tubers, it has been found that effective sprout inhibition is achieved with water solutions comprising 2–5% by weight of the hydrate. It has been found that the degree of growth regulating activity falls off somewhat as the fluorine content of the hydrate components decreases. Thus, it can be expected that hydrates having relatively low fluorine contents would require relatively high dosages for equivalent results. Thus, depending on such factors as described above, dosages will vary and selection of dosages is within the skill of the art.

Formulations comprising one or more of the active compounds may be employed which contain other components for specialized purposes. Emulsifiers or wetting agents, the function of which has been described heretofore include: anionic materials such as sodium and potassium salts of fatty acids, water-soluble alkyl sulfonates and water-soluble aryl sulfonates; cationic materials such as quaternary ammonium bases and fatty amines and non-ionic agents such as condensation products of ethylene oxide with fatty acids, fatty alcohols and fatty amides.

Dispersion mediums, such as the ones described, may be employed for reasons of economics and uniformity.

Spreaders or stickers, such as gum arabic, carboxymethyl cellulose and polyvinyl alcohol may be employed to increase adherence of the formulations to the surfaces of the plant organisms which are contacted therewith.

Diluents comprising other agricultural chemicals which have growth regulating properties may be incorporated into formulations containing the active compounds of the invention. Such diluents may have varied agricultural utility, such as herbicidal, fungicidal, insecticidal or fertilizing properties. Nitrogen and ammonium nitrate, for example, are good diluents and, in addition, function as fertilizers by providing nutrients for the soil.

Waxes may be incorporated with compounds or into formulations used for treating harvested plant organisms for reasons of beautification.

The sprout inhibiting and/or vine killing effects produced by the subject class of perhaloacetones and their corresponding hydrates may be produced on a wide variety of plant organisms. A particular area of interest and effective use for the sprout inhibiting-vine killing compositions of the invention is in the potato industry; however, these compositions may be used effectively for analogous purposes on such other plant organisms as beets, onions, turnips, celery, carrots, flower bulbs such as tulips, daffodils and hyacinths. They may also be used to control and inhibit the growth of suckers, such as on tobacco plants. Other specific applications for the growth regulating compositions of the invention will occur to those skilled in the art.

The following illustrate practice of the invention.

EXAMPLES 1–7

A number of hydrate sprout inhibitors according to the invention were tested for their effectiveness in inhibiting sprout growth by the following procedure: Approximately 10 lbs. of Katahdin variety potato tubers from the same crop and with the same storage history were treated by dipping the tubers, for one minute, in 1, 3, and 5 weight percent water solutions of the inhibitor materials listed in the following table. A total of six replications for each test solution was made. Six replications of check (no treatment of any kind) were also made. The treated and check tubers were stored for four months at a storage temperature of 70° F. At the end of this period, each 10 lb. lot of tubers was rated for sprout control on a relative basis of one to five, with five as no control and one as complete control. On this scale, it was considered that a rating of three would represent commercially acceptable sprout control. The average ratings for the six replications in each category are given in the table.

TABLE III

| Example | Inhibitor | Percent concentration and relative sprout ratings | | |
|---|---|---|---|---|
| | | 1 | 3 | 5 |
| 1 | 2FK | 2.0 | 2.0 | 2.0 |
| 2 | 3FK.XH$_2$O | 2.0 | 1.5 | 1.0 |
| 3 | 4FK.2½H$_2$O | 2.0 | 1.0 | 0.5 |
| 4 | 5FK.3H$_2$O | 2.0 | 1.5 | 1.0 |
| 5 | 6FK.3H$_2$O | 1.0 | 1.0 | 1.0 |
| 6 | A mixture of 5FK.3H$_2$O and 6FK.3H$_2$O in a 1:1 weight ratio. | 3.0 | 1.0 | 1.0 |
| 7 | Check | 5.0 | 5.0 | 5.0 |

EXAMPLE 8–14

6FK·3H$_2$O, a representative hydrate sprout inhibitor of the invention, was tested for its vine killing properties, with and without various additives, on Katahdin variety potato plants. The test procedure was as follows: The test materials were each applied in 90 gallons of water at 40 p.s.i. and at the rate per acreage indicated in the following table. On the day of application, the temperature was about 69° F., the sky was partly cloudy and a light rain fell within 24 hours after application. A total of six replications were made for each test material. Kill ratings were assessed one week after application and at seven day intervals thereafter. The kill rating code used is as follows:
 (1) Poor or no kill of leaves or stems.
 (2) Most leaves killed but poor stem kill.
 (3) All leaves killed and poor stem kill.
 (4) All leaves killed and fair stem kill.
 (5) Good kill both leaves and stems.

The average results of the six replications are given in the table.

TABLE IV

| Example | Additive Material | Additive Amount | Rate/acre (gal.) | Kill ratings First | Second | Third |
|---|---|---|---|---|---|---|
| 8 | None | | ½ | 1.8 | 3.0 | 4.2 |
| 9 | do | | 1 | 3.2 | 4.0 | 4.8 |
| 10 | do | | 2 | | | |
| 11 | Ammonium nitrate | 1:1 wt. ratio based on the nitrate | 1 | 2.2 | 3.7 | 4.5 |
| 12 | Uran [1] | 15 lbs. nitrogen | ½ | 1.7 | 2.7 | 4.5 |
| 13 | Triton GR-7 [2] | | 1 | 2.7 | 4.8 | |
| 14 | do | | 2 | 3.2 | 5.0 | |

[1] Trademark of Allied Chemical Corporation for a mixture of ammonium nitrate and urea containing about 32% nitrogen.
[2] Trademark of Rohm & Haas for an anionic liquid emulsifier comprising dioctyl sodium sulfosuccinate.

EXAMPLE 15

Potato tubers which were harvested from potato plants which were subjected to the vine killing trials according to Example 10 were subjected to an emergency study in order to measure their sprout inhibiting properties caused by translocation of 6FK·3H₂O from the above surface portion of the potato plant into the below surface tuber portion. The study was conducted by employing said tubers as seed potatoes, planting them in the ground and observing emergence of the plant, if any, after a period of ninety days. Untreated potatoes from the same crop were planted as a check. The 6FK·3H₂O treated potatoes gave a 40% emergence as compared with essentially 100% emergence of the check potatoes. Conditions under which the emergence test was conducted were far more conducive to sprouting than would be any conditions which would be likely to exist after harvesting and before ultimate use.

When other hydrates or ketones according to the invention are employed, as described in the above examples, substantially the same results are obtained, i.e., significant sprout inhibition and vine kill take place.

Although the invention has been described with particular emphasis on certain specific active compounds and on potato plants and tubers; it will be understood that this has been done for illustrative purposes only to show preferred embodiments. Accordingly, the invention is to be limited only by the scope of the following claims.

I claim:
1. The method for inhibiting sprout growth on a potato plant organism which comprises treating said potato plant organism with a sprout inhibiting amount of a perhalogenated acetone having the formula:

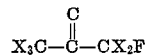

$$X_3C-\overset{\overset{O}{\|}}{C}-CX_2F$$

wherein X may be a member independently selected from the group consisting of F and Cl, or a hydrate thereof.
2. The method of claim 1 in which the sprout inhibiting compound is a hydrate of a perhalogenated acetone.
3. The method of claim 1 in which the sprout inhibiting compound is a hydrate of a perhalogenated acetone.
4. The method of claim 1 in which at least two of the X atoms in the formula are F.
5. The method of claim 1 in which the sprout inhibiting compound is hexafluoroacetone.
6. The method of claim 1 in which the sprout inhibiting compound is a hydrate of a perhaloacetone wherein at least three of the X atoms in the formula are F.
7. The method of claim 1 in which the sprout inhibiting compound is a hydrate of hexafluoroacetone.
8. The method of claim 1 in which the sprout inhibiting compound is $CF_3·CO·CF_3·3H_2O$.
9. The method of claim 1 in which the plant organism is a potato plant.
10. The method of claim 1 in which the plant organism is a potato plant and in which the sprout inhibiting compound is a hydrate of a perhalogenated acetone.
11. The method of claim 1 in which the plant organism is a potato plant and in which the sprout inhibiting compound is a hydrate of hexafluoroacetone.
12. The method of claim 1 in which the plant organism is a potato plant and in which the sprout inhibiting compound is $CF·_3CO·CF_3·3H_2O$.
13. The method of claim 1 in which the sprout inhibiting compound is contacted with the above surface portion of a potato plant, while growing in an amount sufficient to effect substantial destruction of the vines and to effect translocation of a sufficient amount of the sprout inhibiting compound to the sub-surface root portion of the potato plant to inhibit sprouting of the root portion of the (plant organism) potato plant (while in the ground or when harvested).
14. The method of claim 13 in which the sprout inhibiting compound is a hydrate of a perhalogenated acetone.
15. The method of claim 14 in which the perhalogenated acetone contains at least three fluorine atoms.
16. The method of claim 15 in which the perhalogenated acetone is hexafluoroacetone.
17. The method of claim 1 in which the plant organism is a potato tuber.
18. The method of claim 1 in which the plant organism is a potato tuber and in which the sprout inhibiting compound is a hydrate of a perhalogenated acetone.
19. The method of claim 1 in which the plant organism is a potato tuber and in which the sprout inhibiting compound is a hydrate of hexafluoroacetone.
20. The method of claim 1 in which the plant organism is a potato tuber and in which the sprout inhibiting compound is $CF_3·CO·CF_3·3H_2O$.

References Cited

UNITED STATES PATENTS

| | | | |
|---|---|---|---|
| 3,323,984 | 6/1967 | Szabol et al. | 167—22 |
| 2,635,117 | 4/1953 | Woolf et al. | 260—593 |
| 2,764,479 | 9/1956 | Gilbert | 71—123 |

OTHER REFERENCES

Morse et al., Canadian Journal of Chemistry, vol. 33, No. 3, 1955, p. 456.

Henne et al., Journal of the American Chemical Society, vol. 72, 1950, pp. 35–78.

Chemical Abstracts, vol. 54, 1960.

JAMES O. THOMAS, Jr., *Primary Examiner.*

U.S. Cl. X.R.

71—70, 78; 99—154

UNITED STATES PATENT OFFICE
CERTIFICATE OF CORRECTION

Patent No. 3,443,928          Dated May 13, 1969

Inventor(s) Gordon Stanley Batchelor

It is certified that error appears in the above-identified patent and that said Letters Patent are hereby corrected as shown below:

Column 2, that portion of the formula reading $$\begin{matrix} C \\ \| \\ -C- \end{matrix} \quad \text{should read} \quad \begin{matrix} O \\ \| \\ -C- \end{matrix}$$

Column 7, line 20, the word "emergency" should read --emergence--.

Claim 1, that portion of the formula reading $$\begin{matrix} C \\ \| \\ -C- \end{matrix} \quad \text{should read} \quad \begin{matrix} O \\ \| \\ -C- \end{matrix}$$

Claim 2, line 2, the expression "a hydrate of" should be deleted.

Claim 12, line 3, that portion of the formula reading $CF\cdot_3$   should read   $CF_3\cdot$ Claim 13, lines 8 and 9, the expressions (plant organism) and (while in the ground or when harvested). should be deleted.

SIGNED AND
SEALED
FEB 24 1970

(SEAL)
Attest:

Edward M. Fletcher, Jr.
Attesting Officer

WILLIAM E. SCHUYLER, JR.
Commissioner of Patents